United States Patent
Son et al.

(10) Patent No.: US 8,663,831 B2
(45) Date of Patent: Mar. 4, 2014

(54) RECHARGEABLE BATTERY AND ITS FABRICATION METHOD

(75) Inventors: Sukjung Son, Yongin-si (KR); Chanjung Kim, Yongin-si (KR); Jaewoong Kim, Yongin-si (KR); Yunkyung Jo, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 920 days.

(21) Appl. No.: 12/073,634

(22) Filed: Mar. 7, 2008

(65) Prior Publication Data

US 2008/0233474 A1    Sep. 25, 2008

(30) Foreign Application Priority Data

Mar. 19, 2007    (KR) .................. 10-2007-0026632

(51) Int. Cl.
  *H01M 2/02*  (2006.01)
  *H01M 2/08*  (2006.01)
  *H01M 2/14*  (2006.01)
  *H01M 4/64*  (2006.01)

(52) U.S. Cl.
  USPC ........... 429/129; 429/164; 429/185; 429/233; 429/246

(58) Field of Classification Search
  USPC ........... 429/186, 130, 94, 129, 185, 246, 119, 429/161, 211, 233; 29/623.2
  See application file for complete search history.

(56) References Cited

U.S. PATENT DOCUMENTS

| | | | |
|---|---|---|---|
| 3,261,718 A * | 7/1966 | Wilke | 429/119 |
| 5,047,300 A * | 9/1991 | Juergens | 429/94 |
| 6,743,546 B1 | 6/2004 | Kaneda et al. | |
| 2001/0041288 A1 * | 11/2001 | Onishi et al. | 429/161 |
| 2005/0084753 A1 * | 4/2005 | Kim | 429/186 |
| 2006/0093902 A1 * | 5/2006 | Lee | 429/130 |
| 2006/0147793 A1 * | 7/2006 | Kim et al. | 429/94 |

FOREIGN PATENT DOCUMENTS

| | | |
|---|---|---|
| CN | 1518157 A | 8/2004 |
| CN | 1612376 A | 5/2005 |
| JP | 2001-185224 | 7/2001 |
| JP | 2001-307760 | 11/2001 |
| JP | 2005-243336 | 9/2005 |
| KR | 10-2006-0028180 | 3/2006 |
| KR | 2006-0092429 | 8/2006 |

* cited by examiner

*Primary Examiner* — Kenneth Douyette
(74) *Attorney, Agent, or Firm* — Robert E. Bushnell, Esq.

(57) ABSTRACT

A rechargeable battery and its fabrication method prevents electrical shorts between the electrode plates by decreasing shrinkage of the separator, the battery includes: an electrode assembly including: a wound electrode jelly roll having a first electrode plate with a first electrode tab attached thereto, a second electrode plate with a second electrode tab attached thereto and a separator interposed between the first electrode plate and the second electrode plate, and an upper tape arranged to surround an upper end of the electrode jelly roll where the first electrode tab and second electrode tab extend outward therefrom; a case having an upper end opening arranged to receive the electrode assembly and an electrolyte; and a cap assembly arranged to seal the upper end opening of the case after the electrode assembly has been received in the case; the upper tape is attached to the upper end of the electrode jelly roll and surrounds the separator adjacent to an end of an innermost electrode plate of the first and second electrode plates.

20 Claims, 5 Drawing Sheets

RECHARGEABLE BATTERY AND ITS FABRICATION METHOD

CLAIM OF PRIORITY

This application makes reference to, incorporates the same herein, and claims all benefits accruing under 35 U.S.C. §119 from an application for RECHARGEABLE BATTERY earlier filed in the Korean Intellectual Property Office on the 19th of Mar. 2007 and there duly assigned Serial No. 2007-0026632.

BACKGROUND OF INVENTION

1. Field of the Invention

The present invention relates to a rechargeable battery and its fabrication method, and more particularly, the present invention relates to a rechargeable battery and its fabrication method, the battery preventing electrical shorts between the electrode plates by decreasing shrinkage of a separator of the battery.

2. Description of the Related Art

Various batteries have been used as a power source of small electronic devices. As a power source of portable phones, notebook computers, camcorders and the like, the battery using an electrolyte, such as a lithium rechargeable battery that is a small sealed battery of a large capacity has been generally used. As such an electrolyte battery, a cylindrical or a prismatic type battery has been used.

Generally, a rechargeable battery, such as a lithium rechargeable battery and a lithium polymer battery includes an electrode assembly with an electrolyte contained within the case. The electrode assembly includes a positive electrode plate, a separate and a negative electrode plate. The positive electrode plate (or negative electrode plate) includes a positive electrode (or negative electrode) collector in the type of foil and a positive electrode active material coated on the surface of the positive electrode collector. An uncoated region in which an active material has not been coated is formed on the collector of the plates, and an electrode tab is generally welded to the uncoated region for connection to an external circuit.

In more detail, the lithium rechargeable battery is formed by respectively coating an active material on the positive electrode collector and negative electrode collector and arranging it in a case as an electrode assembly of a wound jelly-roll type having a separator interposed between the collectors, and injecting an electrolyte and covering the opening of the case with a cap assembly.

The lithium rechargeable battery is classified into a cylindrical type battery having a jelly-roll arranged within a cylindrical case, and a prismatic type battery having the jelly-roll arranged within a prismatic case. However, the prismatic type rechargeable battery has been generally used for small or thin devices having a rectangular receptacle.

In the prismatic rechargeable battery, to arrange the electrode assembly in the case, the electrode assembly is wound, fixed by a finishing tape, and then pressed.

In other words, the finishing tape is attached by wrapping the end portion where the winding of the jelly-roll type electrode assembly has been finished at the circumferential surface of the jelly-roll type electrode assembly that is formed by winding a positive electrode plate, a separator and a negative electrode plate in sequence.

The positive electrode plate and negative electrode plate are formed generally by coating and filling an active material for a metal base, and drying, roll-pressing and cutting the metal base even though it is somewhat different depending on the kind of the rechargeable battery. For a lithium rechargeable battery, a lithium transition metal oxide is used as the active material of the positive electrode plate and aluminum is used as a collector of the positive electrode plate. Furthermore, carbon and carbon composite are used as the active material of the negative electrode plate and copper is used as a collector of the negative electrode plate.

Furthermore, the separator separates the positive electrode plate and the negative electrode plate so as to not directly contact to cause electrical shorts. A micro-porous film made of polyolefin resin, such as polyethylene or polypropylene, is used as the separator.

The separator is formed longer than the positive electrode plate and the negative electrode plate for preventing an electrical short caused by contact between the positive electrode plate and negative electrode plate when winding the positive electrode plate, the separator and the negative electrode plate.

However, an outmost base portion of the electrode assembly that the winding has been completed is fixed by a finishing tape after the positive electrode plate of aluminum (or the negative electrode plate of copper) has been finally wound and finished. In other words, the finishing tape is attached on the surface of the positive electrode collector of the positive electrode located at the outmost of the wound electrode assembly.

As described above, the finishing tape finishes the wound electrode assembly and simultaneously holds the positive electrode plate attached to the surface of the positive electrode collector of the positive electrode. However, because this finishing tape is not directly attached to the separator for preventing electrical shorts between the positive electrode plate and the negative electrode plate by being interposed between the positive electrode plate and the negative electrode plate, the finishing tape can not well hold the separator so as to not be deformed.

Accordingly, when the separator made of resin shrinks horizontally or longitudinally (vertically) due to a charge or discharge of the battery or a heat shock, especially when the separator shrinks horizontally or longitudinally (vertically) as a result of an electrode tab generating a large amount of heat at the upper region of the electrode assembly where much of the electrical current flows, because the separator shrinks and simultaneously the end portions of the positive electrode plate and the negative electrode plate contact each other, thereby causing an electrical short.

SUMMARY OF THE INVENTION

Accordingly, an object of the present invention is to provide a rechargeable battery and its fabrication method, the battery preventing electrical shorts between the electrode plates by decreasing the shrinkage of the separator.

According to one aspect of the present invention, a rechargeable battery is provided, the battery including: an electrode assembly including: a wound electrode jelly roll having a first electrode plate with a first electrode tab attached thereto, a second electrode plate with a second electrode tab attached thereto and a separator interposed between the first electrode plate and the second electrode plate, and an upper tape arranged to surround an upper end of the electrode jelly roll where the first electrode tab and second electrode tab extend outward therefrom; a case having an upper end opening arranged to receive the electrode assembly and an electrolyte; and a cap assembly arranged to seal the upper end opening of the case after the electrode assembly has been received in the case; the upper tape is attached to the upper end of the electrode jelly roll and surrounds the separator adjacent to an end of an innermost electrode plate of the first and second electrode plates.

The first electrode plate may include: a first electrode collector, a first electrode active material layer coated on both surfaces of the first electrode collector, a first uncoated electrode region at both ends of the first electrode collector where the first electrode active material layer has not been coated, and wherein the first electrode tab is attached to one end of the first uncoated electrode region; and the second electrode plate may include a second electrode collector, a second electrode active material layer coated on both surfaces of the second electrode collector, a second uncoated electrode region at both ends of the second electrode collector where the second electrode active material layer has not been coated, and wherein the second electrode tab is attached to one end of the second uncoated electrode region; and the second electrode tab is arranged on one side of the electrode jelly roll about a center of the electrode jelly roll and the first electrode tab is located on another side of the electrode jelly roll about the center of the electrode jelly roll.

The upper tape may be attached to surround the separator arranged between an end of the electrode active material layer and an end of the uncoated electrode region of an innermost one of the first and second electrode plates.

The first electrode plate may be a positive electrode plate and the second electrode plate may be a negative electrode plate.

The winding of the electrode jelly roll may be arranged from a center thereof in an order of the second electrode plate, the separator and the first electrode plate.

The upper tape may be attached to a first region including the separator between an end of the second electrode active material layer and an end of the second uncoated electrode region of the second electrode plate. The upper tape may be attached to a second region opposite to the first region about the center of the electrode jelly roll.

The first region may be arranged outside of the second electrode tab in a first direction about the center of the electrode jelly roll, and the second region may be arranged outside of the first electrode tab in a second direction about the center of the electrode jelly roll.

The upper tape may be attached between the first electrode tab and the second electrode tab about the center of the electrode jelly roll. The upper tape may include an insulating material having a high heat resistance. The upper tape may include an adhesive coated on a synthetic resin selected from the group consisting of polyethylene terephthalate (PET), polypropylene (PP) and polyimide (PI). The upper tape may fix the separator projected outward from the upper end of the electrode jelly roll more than the first electrode plate and second electrode plate. The upper tape may surround a pair of long sides of an upper face of the electrode jelly roll and side faces thereof and may continue to the upper face.

The electrode assembly may include a finishing tape surrounding an outmost layer of the electrode jelly roll. The electrode assembly may include a lower tape surrounding a lower end of the electrode jelly roll.

The upper tape may have the same thickness as the lower tape.

According to another aspect of the present invention, a method of fabricating a rechargeable battery is provided, the method including: fabricating an electrode assembly including: winding an electrode jelly roll having a first electrode plate with a first electrode tab and a second electrode plate with a second electrode tab and a separator interposed between the first electrode plate and the second electrode plate; arranging an upper tape to surround an upper end of the electrode jelly roll where the first electrode tab and second electrode tab extend outward therefrom; arranging the electrode assembly within an upper end opening of a case; arranging a cap assembly to cover the upper end opening of the case after the electrode assembly has been received in the case; and injecting an electrolyte and sealing the rechargeable batter; wherein the upper tape is attached to the upper end of the electrode jelly roll and surrounds the separator adjacent to an end of an innermost electrode plate of the first and second electrode plates.

The first electrode plate may include a first electrode collector, a first electrode active material layer coated on both surfaces of the first electrode collector, a first uncoated electrode region at both ends of the first electrode collector where the first electrode active material layer has not been coated, and the first electrode tab is attached to one end of the first uncoated electrode region; and the second electrode plate may include a second electrode collector, a second electrode active material layer coated on both surfaces of the second electrode collector, a second uncoated electrode region at both ends of the second electrode collector where the second electrode active material layer has not been coated, and wherein the second electrode tab is attached to one end of the second uncoated electrode region; and the second electrode tab is arranged on one side of the electrode jelly roll about a center of the electrode jelly roll and the first electrode tab is located on another side of the electrode jelly roll about the center of the electrode jelly roll.

The upper tape may be attached to surround the separator arranged between an end of the electrode active material layer and an end of the uncoated electrode region of an innermost one of the first and second electrode plates.

The electrode jelly roll may be wound from a center thereof in an order of the second electrode plate, the separator and the first electrode plate.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention are described in detail with reference to the accompanying drawings.

Figure 1:
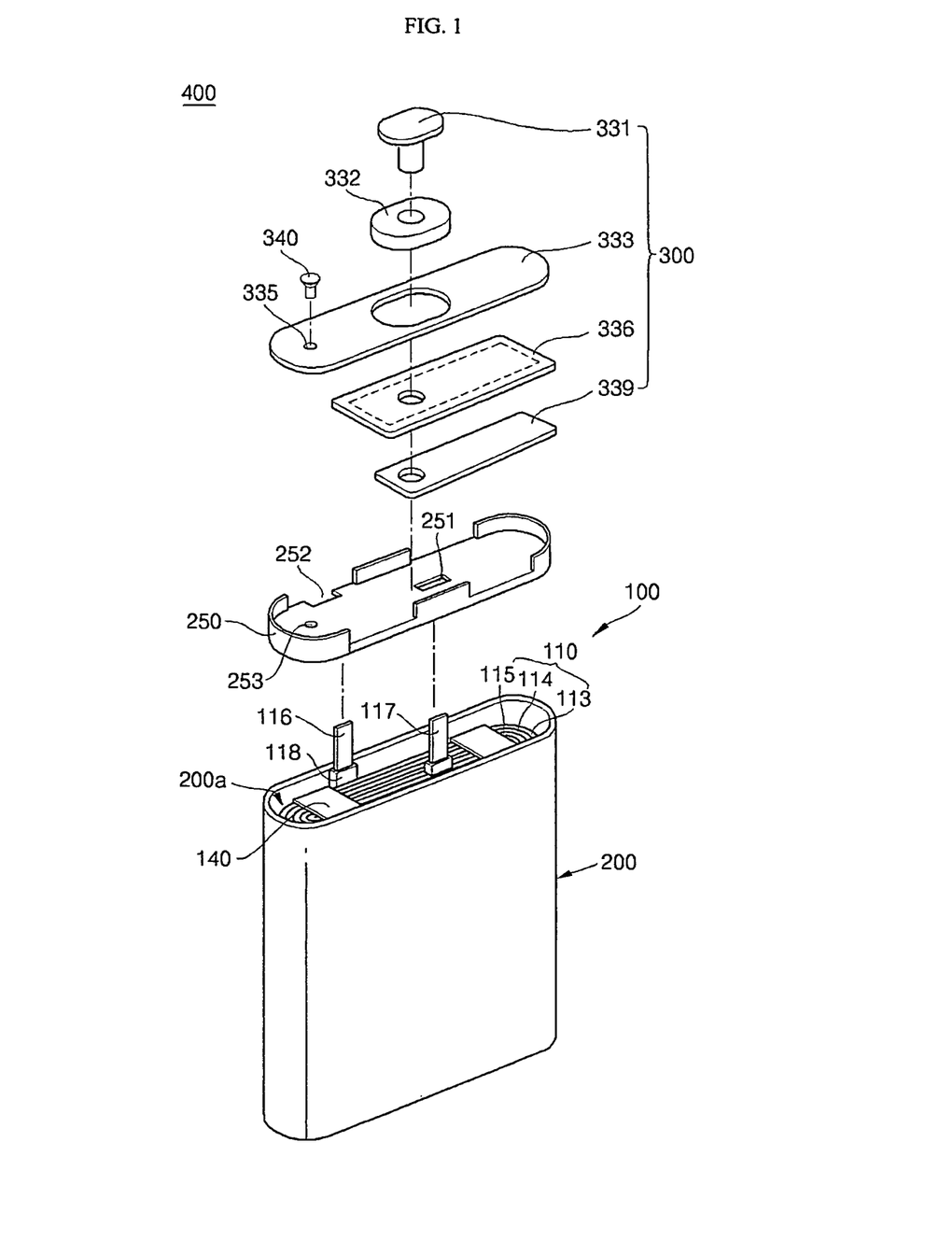
FIG. 1 is an exploded perspective view of a rechargeable battery according to one exemplary embodiment of the present invention.
Figure 2:
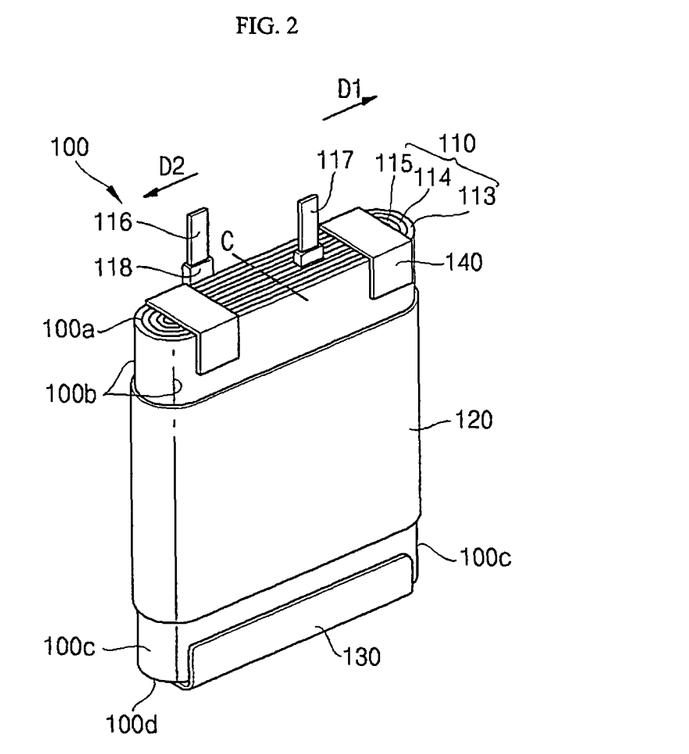
FIG. 2 is a perspective view of an electrode assembly of the rechargeable battery of FIG. 1.
Figure 3:
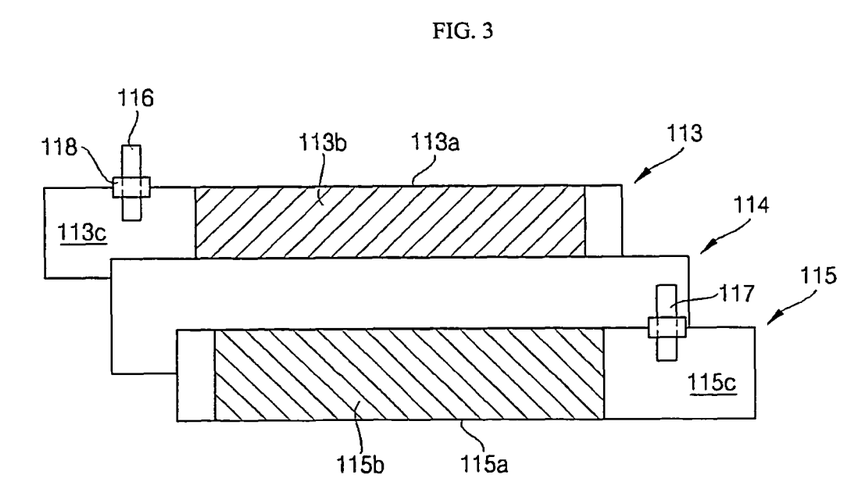
FIG. 3 is a view of the layout of an electrode jelly roll before being wound in the electrode assembly of FIG. 2.
Figure 4:
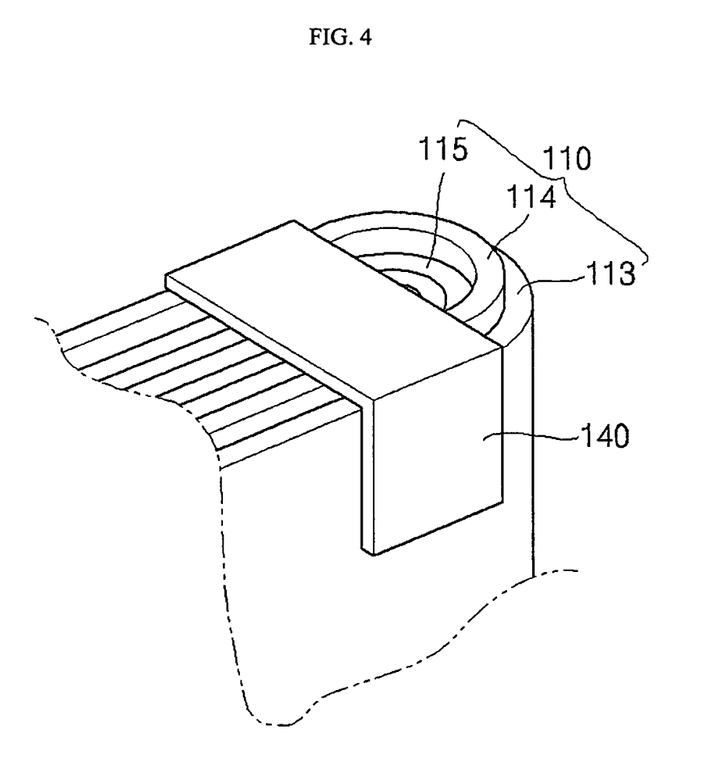
FIG. 4 is an enlarged partial perspective view of a portion of the upper end of the electrode jelly roll in the electrode assembly of FIG. 1.

FIG. 1 is an exploded perspective view of a rechargeable battery according to one exemplary embodiment of the present invention, and FIG. 2 is a perspective view of an electrode assembly of the rechargeable battery of FIG. 1, and FIG. 3 is a view of the layout of an electrode jelly roll before being wound into the electrode assembly of FIG. 2 and FIG. 4 is an enlarged partial perspective view of a portion of the upper end of the electrode jelly roll in the electrode assembly of FIG. 1.

Referring to FIG. 1, the rechargeable battery 400, for example, a prismatic type rechargeable battery, includes an electrode assembly 100 on which an upper tape 140 is attached, a case 200 that receives the electrode assembly 100 and an electrolyte (not shown), and a cap assembly 300 sealing the upper opening 200a of the case 200 as shown in FIG. 1.

Referring to FIG. 2 and FIG. 3, the electrode assembly 100 includes an electrode jelly roll 110, a finishing tape 120 for finishing the electrode jelly roll 110, a lower tape 130 attached to surround the lower end of the electrode jelly roll 110, and an upper tape 140 attached to surround the upper end of the electrode jelly roll 110.

The electrode jelly roll 110 includes a first electrode plate 113, a second electrode plate 115 and a separator 114 interposed between the first electrode plate 113 and the second electrode plate 115. The first electrode plate 113, the second electrode plate and the separator 114 are wound altogether.

The first electrode plate 113 includes a first electrode active material layer 113b coated on both faces of a first electrode collector 113a formed of a highly conductive thin metal plate, for example, aluminum (Al) foil. As the first electrode active material, a chalcogenide compound is used. For example, composite metal oxides, such as $LiCoO_2$, $LiMn_2O_4$, $LiNiO_2$, $LiNi_{1-x}Co_xO_2$ ($0<x<1$), $LiMnO_2$ can be used. However, the present invention is not limited thereto. A first uncoated electrode region 113c that is not provided with the first active material layer 113b is located on both ends of the first electrode collector 113a, and a first electrode tab 116 is formed at one end of the first uncoated electrode region 113c. The one end of the first electrode tab 116 is electrically coupled to the first uncoated electrode region 113c, and the other end extends outside. The first electrode plate 113 may be a positive electrode plate that functions as a positive electrode.

The second electrode plate 115 includes a second electrode active material layer 115b coated on both faces of a second electrode collector 115a formed of a conductive thin metal plate, for example, copper (Cu) or nickel (Ni) foil. As the second electrode active material, a carbon material, Si, Sn, tin oxide, composite tin alloys, a transition metal oxide and lithium metal nitride or lithium metal oxide can be used. However, the present invention is not limited thereto. A second uncoated electrode region 115c that is not provided with the second active material layer 115b is located on both ends of the second electrode collector 115a, and a second electrode tab 117 is formed at one end of the second uncoated electrode region 115c. One end of the second electrode tab 117 is electrically coupled to the second uncoated electrode region 115c, and the other end extends outside. The second electrode tab 117 may be located on one side of the electrode jelly roll 110 about the center C of the electrode jelly roll 110, and the first electrode tab 116 may be located on the other side of the electrode jelly roll 110. The second electrode plate 115 may be a negative electrode plate that functions as a negative electrode.

The separator 114 is provided to prevent electrical shorts between the first electrode plate 113 and the second electrode plate 115, and is formed of any material selected from the group consisting of polyethylene, polypropylene and a copolymer of polyethylene and polypropylene. However, the present invention is not limited thereto. The separator 114 is preferably formed wider in a vertical direction than the first electrode plate 113 and the second electrode plate 115 in order to prevent electrical shorts between the first electrode plate 113 and the second electrode plate 115. Accordingly, the separator 114 extends outside from the wound electrode jelly roll 110 more than the first electrode plate 113 and the second electrode plate 115.

The first electrode plate 113 and the second electrode plate 115, a first electrode tap 116 and a second electrode tabs 117 may be located with the polarity interchanged, and an insulation member 118 may be wound on the border region where the first electrode tap 116 and the second electrode tab 117 respectively extend outwards from the first electrode plate 113 and the second electrode plate 115 to prevent electrical shorts between the tabs 116 and 117 and the two electrode plates 113 and 115.

A finishing tape 120 is attached to surround the outmost layer of the electrode jelly roll 110 that is formed by winding the first electrode plate 113, the separator 114 and the second electrode plate 115 together. The finishing tape 120 may be an adhesive tape having an insulation property and a high heat resistance. The outmost layer of the electrode jelly roll 110 is the first electrode plate 113 and may be the second electrode plate 115 according to the embodiment of the present invention.

The external appearance of the electrode jelly roll 110 finished by the finishing tape 120 is constituted of an upper face 100a that the first electrode tab 116 and the second electrode tab 117 extend outwards from, a pair of long side faces 100b and a pair of short side faces 100c that are continued to the upper face, and a lower face 100d.

According to the present invention, the region that the first electrode tab 116 and the second electrode tab 117 extend outwards from is called an upper end of the electrode jelly roll 110, and the opposite end to the upper end is called a lower end thereof.

The lower tape 130 is attached by arranging the lower face 100d and the pair of long side faces 100b of the electrode jelly roll 110 so as to surround the lower end of the electrode jelly roll 110. The lower tape 130 fixes the separator 114 projected from the lower end of the electrode jelly roll 110 more than the first electrode plate 113 and the second electrode plate 115, and additionally, enables the electrode assembly 100 to be easily interposed without any interference with the upper opening 200a of the battery case 200 when the electrode assembly 100 is inserted inside a case 200 that is described hereinafter. The lower tape 130 may be also an adhesive tape like as the finishing tape 120.

The upper tape 140 is attached by arranging the upper face 100a and the pair of long side faces 100b of the electrode jelly roll 110 so as to surround the upper end of the electrode jelly roll 110. The upper tape 140 is attached to the outside of the second electrode tab 117 in first direction (D1) from the center(C) of the electrode jelly roll 110 and to the outside of the first electrode tab 116 in the second direction (D2) from the center(C) of the electrode jelly roll 110.

The upper tape 140 is attached to the separator 114 extending outwards from the upper end of the electrode jelly roll 110 more than the first electrode plate 113 and the second electrode plate 115 and fixes the separator 114 as shown in FIG. 4. The separator 114 is fixed by the upper tape 140 so that the separator 114 can be prevented from shrinking in a vertical direction that is a longitudinal direction of the electrode assembly 100 or in horizontal direction by heat generated due to an overcharge of the rechargeable battery. In more detail, a large amount of heat is generated at the upper end of the electrode jelly roll 110 due to an electrical current flow through the first electrode tab 116 and the second electrode tab 117 during the charging or discharging of the rechargeable battery. The upper tape 140 take a significant role in preventing the separator 114 from shrinking due to the heat. Accordingly, the upper tape 140 prevents the separator 114 at the upper end of the electrode jelly roll 110 from shrinking, thereby preventing electrical shorts between the first electrode plate 113 and the second electrode plate 115.

The upper tape 140 has the same thickness as the lower tape 130 so as not to increase the thickness of the electrode jelly roll 110. Furthermore, the upper tape 140 is formed by coating an adhesive on a resin host material having an insulation property and a high heat resistance like the lower tape 130, for example, any material selected from the group consisting of polyethylene terephthalate (PET), polypropylene (PP) and polyimide (PI).

The case 200 is formed of aluminum or an aluminum alloy having a roughly rectangular shape. The electrode assembly 100 is received in the case 200 through the upper opening 200a of the case 200 so that the case 200 functions as a receptacle to receive the electrode assembly 100 and the electrolyte. The case 200 itself can function as a terminal. According to the present invention, because the outmost layer of the electrode assembly 100 is the first electrode plate 113, the case 200 functions as a positive electrode.

The cap assembly 300 includes a cap plate 333, an insulation plate 336, a terminal plate 339 and an electrode terminal 331. A gasket tube 332 is interposed between the cap plate 333 and the electrode terminal 331, and the electrode terminal 331 and the terminal plate 339 are electrically coupled to each other. The insulation plate 336 insulates the cap plate 333 from the terminal plate 339. An electrolyte injection hole 335 is formed on one side of the cap plate 333. A stopper 340 is provided with the electrolyte injection hole 335 for sealing the electrolyte injection hole after the electrolyte has been injected.

An insulation case 250 is provided between the cap assembly 300 and the electrode assembly 100, more particularly, on the upper face of the electrode assembly 100 at the lower portion of the cap assembly. A first electrode tab through-hole 251 is formed on one side of the insulation case 250 for the second electrode tab 117 passing, and a second electrode tab through-hole 252 is formed on another side of the insulation case, that is, to the position corresponding to the first electrode tab 116. In addition, an electrolyte through-hole 253 is further formed on another side of the insulation case 250. The electrolyte feeding hole may not be formed additionally.

Hereinafter, the position where the upper tape 140 is attached to the upper end of the electrode jelly roll 110 to prevent the separator 114 from shrinking is described in detail with reference to FIG. 5.

Figure 5:
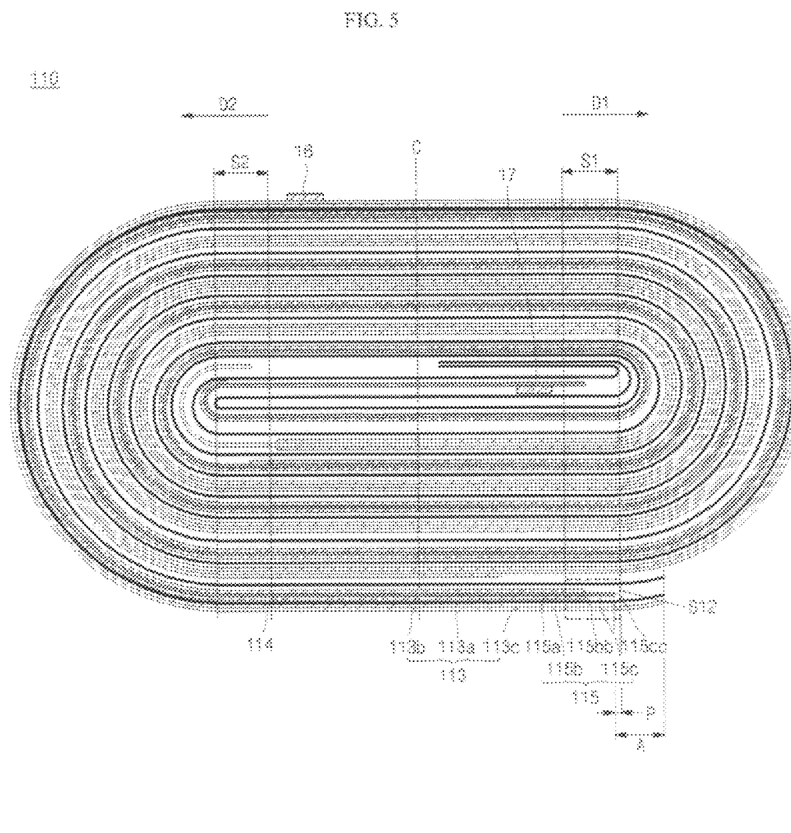
FIG. 5 is a plan view of the upper end of the electrode jelly roll where an upper tape is attached in the electrode assembly of FIG. 1.

FIG. 5 is a plan view of the upper end of the electrode jelly roll where an upper tape is attached in the electrode assembly of FIG. 1

The upper tape 140 is attached to the end of one electrode plate of the first electrode plate 113 and the second electrode plate 115 that the winding of the electrode jelly roll 110 is finished prior to the other electrode plate so as to surround the separator at the upper end of the electrode jelly roll 110.

For example, as shown in FIG. 5, when the winding of the electrode jelly roll 10 is finished in order of the second electrode plate 115, the separator 114 and the first electrode plate 113, the upper tape 140 is attached so as to surround the end of the second electrode plate 115 where the winding is finished prior at the upper end of the electrode jelly roll 110, that is, so as to surround a region of the section A between the second uncoated electrode region 115c and the end of the separator 114. This is to prevent the second electrode plate 115 and the first electrode plate 113 from contacting each other even if the separator 114 shrinks in horizontal direction by the heat generated due to an overcharge of the rechargeable battery.

In addition, the upper tape 140 may be attached so as to surround the separator close to the gap between the end of the electrode active material layer and the uncoated electrode region of the electrode plate that the winding of the electrode jelly roll 110 is finished prior to the other electrode plate.

For example, as shown in FIG. 5, when the winding of the electrode jelly roll 110 is finished in order of the second electrode plate 115, the separator 114 and the first electrode plate 113, the upper tape 140 may be attached to a first region S1 including the separator 114 adjacent in between the end 115bb of the second electrode active material layer and the end 115cc of the second uncoated electrode region of the second electrode plate 115 that the winding of the electrode jelly roll 110 is finished prior to the other electrode plate. This is to prevent electrical shorts caused by the contact at least between the first uncoated electrode region 113c and the second electrode active material layer 115c because the spark due to an electrical short between the first uncoated electrode region 113c and the second electrode active material layer 115c is most strong and has a great possibility of firing among an electrical short between the first uncoated electrode region 113c and the second uncoated electrode region 115c, an electrical short between the first uncoated electrode region 113c and the second electrode active material layer 115c, an electrical short between the first electrode active material layer 113b and the second uncoated electrode region 115c and an electrical short between the first electrode active material layer 113b and the second electrode active material layer 115b.

The upper tape 140 is attached to a first region S1 including the separator 114 in between the end 115bb of the second electrode active material layer and the end 115cc of the second uncoated electrode region of the second electrode plate 115 that the winding of the electrode jelly roll 110 is finished prior to the other electrode plate and fixes the separator 114 between the end 115bb of the second electrode active material layer and the end 115cc of the second uncoated electrode region, to thereby prevent the separator 114 from shrinking due to heat in a horizontal direction to the region where the end 115bb of the second electrode active material layer and the first uncoated electrode region 113c face each other. Accordingly, an electrical short due to the contact between the second electrode active material layer 115b and the first uncoated electrode region 113c is prevented so that the spark and firing between the second electrode active material layer 115b and the first uncoated electrode region 113c can be prevented. Therefore, the safety of the rechargeable battery can be improved.

The upper tape 140 may be attached to not only the first region S1 including the separator 114a in between the end 115bb of the second electrode active material layer and the end 115cc of the second uncoated electrode region of the second electrode plate 115 that the winding of the electrode jelly roll 110 is finished prior to the other electrode plate, but also to a second region S2 opposite to the first region S1 about the center(C) of the electrode jelly roll 110. This is to prevent the separator 114 from shrinking more efficiently by fixing the separator 114 well balanced at the upper end of the electrode jelly roll 110.

In the rechargeable battery according to the above-noted example of the present invention, because the separator 114 extending outwardly from the upper end of the electrode jelly roll 110 is fixed by the upper tape 140, it is possible to prevent the separator 114 from shrinking in a longitudinal(vertical) direction or in a horizontal direction due to the heat caused by charging or discharging of the battery. Accordingly, an electrical short between the first electrode plate 113 and the second electrode plate 115 is prevented. Therefore, the safety of the rechargeable battery can be improved by preventing the firing due to electrical shorts between the electrode plates.

Figure 6:
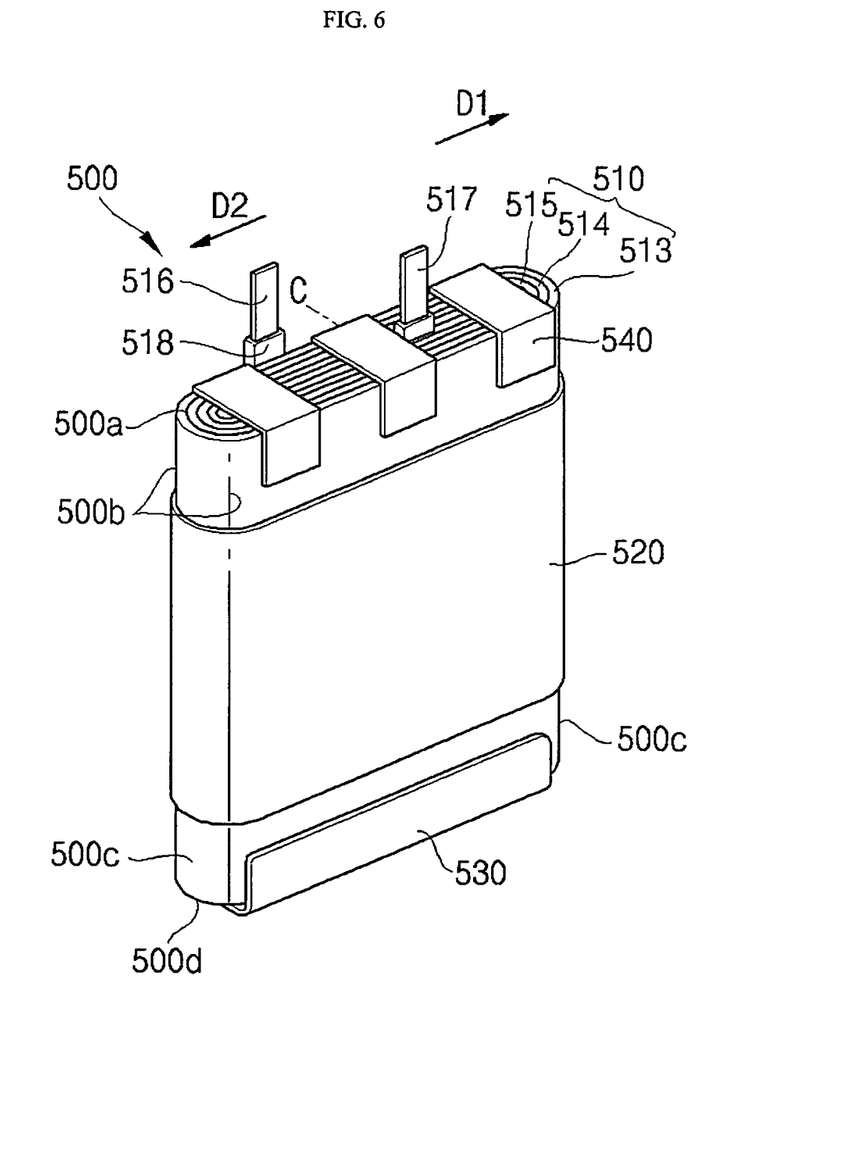
FIG. 6 is a perspective view of an electrode assembly of a rechargeable battery according to another exemplary embodiment of the present invention.

FIG. 6 is a perspective view of an electrode assembly of a rechargeable battery according to another exemplary embodiment of the present invention.

The rechargeable battery according to another embodiment of the present invention has the same construction and function as the rechargeable battery of the first embodiment of the present invention except that an upper tape 540 is further attached to an electrode jelly roll 510 of an electrode assembly 500. Therefore, the overlapped explanation will be omitted about the same elements and functions.

Referring to FIG. 6, in the electrode assembly 500 of the rechargeable battery according to another example of the present invention, compared with the electrode assembly 100 of the rechargeable battery 400 according to the first example of the present invention, the upper tape 540 attached on both sides of the upper end is further attached between a first electrode tab 516 and a second electrode tab 517.

Therefore, the electrode assembly 500 fixes more efficiently the separator 514 of the electrode jelly roll 510, compared with the electrode assembly 100 of the rechargeable battery 400, thereby preventing the separator 514 from being shrunk by heat. Accordingly, electrical shorts between the first electrode plate 513 and the second electrode plate 515 that are generated by the shrinking of the separator 514 can be prevented and so the safety of the rechargeable battery can be improved.

In addition, although the electrode assemblies (100 and 500) fixing the separators (114 and 514) by attaching the upper tapes (140 and 540) has been explained as applied to the prismatic rechargeable battery, they can be applied to a polymer type rechargeable battery.

The rechargeable battery according to the present invention produces the following effects. The separator extending from the upper end of the electrode jelly roll to the outside is fixed by surrounding the upper end of the electrode jelly roll with the upper tape, thereby preventing the separator from shrinking in the longitudinal(vertical) direction or in the horizontal direction due to heat.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as being limitations of the present invention.

What is claimed is:

1. A rechargeable battery comprising:
an electrode assembly including: a wound electrode jelly roll having a first electrode plate with a first electrode tab attached thereto, a second electrode plate with a second electrode tab attached thereto and a separator interposed between the first electrode plate and the second electrode plate, and an upper tape arranged to surround an upper end of the electrode jelly roll where the first electrode tab and second electrode tab extend outward therefrom, the separator extending outwards from the upper end of the jelly roll more than the first electrode plate and the second electrode plate;
a case having an upper end opening arranged to receive the electrode assembly and an electrolyte; and
a cap assembly arranged to seal the upper end opening of the case after the electrode assembly has been received in the case;
wherein the upper tape is attached to the upper end of the electrode jelly roll and surrounds the separator adjacent to an end of an innermost electrode plate of the first and second electrode plates, with said end of the innermost electrode plate being an end of the innermost electrode plate along a direction in which the first and second electrode plates are wound,
the upper tape being attached to the separator extending outwards from the upper end of the jelly roll.

2. The rechargeable battery of claim 1, wherein the first electrode plate comprises a first electrode collector, a first electrode active material layer coated on both surfaces of the first electrode collector, a first uncoated electrode region at both ends of the first electrode collector where the first electrode active material layer has not been coated, and wherein the first electrode tab is attached to one end of the first uncoated electrode region; and
wherein the second electrode plate comprises a second electrode collector, a second electrode active material layer coated on both surfaces of the second electrode collector, a second uncoated electrode region at both ends of the second electrode collector where the second electrode active material layer has not been coated, and wherein the second electrode tab is attached to one end of the second uncoated electrode region; and
wherein the second electrode tab is arranged on one side of the electrode jelly roll about a center of the electrode jelly roll and the first electrode tab is located on another side of the electrode jelly roll about the center of the electrode jelly roll.

3. The rechargeable battery of claim 2, wherein the upper tape is attached to surround the separator arranged between an end of the electrode active material layer and an end of the uncoated electrode region of the innermost one of the first and second electrode plates, with said end of the electrode active material layer being an end of the electrode active material layer along the direction in which the first and second electrode plates are wound, and said end of the uncoated electrode region being an end of the uncoated electrode region along the direction in which the first and second electrode plates are wound.

4. The rechargeable battery of claim 2, wherein the first electrode plate is a positive electrode plate and the second electrode plate is a negative electrode plate.

5. The rechargeable battery of claim 4, wherein the winding of the electrode jelly roll is arranged from a center thereof in an order of the second electrode plate, the separator and the first electrode plate.

6. The rechargeable battery of claim 5, wherein the upper tape is attached to a first region including the separator between an end of the second electrode active material layer and an end of the second uncoated electrode region of the second electrode plate, with said end of the second electrode active material layer being an end of the second electrode active material layer along the direction in which the first and second electrode plates are wound, and said end of the second uncoated electrode region being an end of the second uncoated electrode region along the direction in which the first and second electrode plates are wound.

7. The rechargeable battery of claim 6, wherein the upper tape is attached to a second region opposite to the first region about the center of the electrode jelly roll.

8. The rechargeable battery of claim 7, wherein the first region is arranged outside of the second electrode tab in a first direction about the center of the electrode jelly roll, and the second region is arranged outside of the first electrode tab in a second direction about the center of the electrode jelly roll.

9. The rechargeable battery of claim 7, wherein the upper tape is attached between the first electrode tab and the second electrode tab about the center of the electrode jelly roll.

10. The rechargeable battery of claim 1, wherein the upper tape comprises an insulating material having a high heat resistance.

11. The rechargeable battery of claim 10, wherein the upper tape comprises an adhesive coated on a synthetic resin selected from the group consisting of polyethylene terephthalate (PET), polypropylene (PP) and polyimide (PI).

12. The rechargeable battery of claim 1, wherein the upper tape fixes the separator projected outward from the upper end of the electrode jelly roll more than the first electrode plate and second electrode plate.

13. The rechargeable battery of claim 12, wherein the upper tape surrounds a pair of long sides of an upper face of the electrode jelly roll and side faces thereof and continues to the upper face.

14. The rechargeable battery of claim 1, wherein the electrode assembly comprises a finishing tape surrounding an outmost layer of the electrode jelly roll.

15. The rechargeable battery of claim 1, wherein the electrode assembly comprises a lower tape surrounding a lower end of the electrode jelly roll.

16. The rechargeable battery of claim 15, wherein the upper tape has the same thickness as the lower tape.

17. A method of fabricating a rechargeable battery, the method comprising:
fabricating an electrode assembly including:
winding an electrode jelly roll having a first electrode plate with a first electrode tab and a second electrode plate with a second electrode tab and a separator interposed between the first electrode plate and the second electrode plate, the separator extending outwards from the upper end of the jelly roll more than the first electrode plate and the second electrode plate;
arranging an upper tape to surround an upper end of the electrode jelly roll where the first electrode tab and second electrode tab extend outward therefrom;
arranging the electrode assembly within an upper end opening of a case;
arranging a cap assembly to cover the upper end opening of the case after the electrode assembly has been received in the case; and
injecting an electrolyte and sealing the rechargeable battery;
wherein the upper tape is attached to the separator adjacent to an end of an innermost electrode plate of the first and second electrode plates and extending outwards from the upper end of the jelly roll, with said end of the innermost electrode plate being an end of the innermost electrode plate along a direction in which the first and second electrode plates are wound.

18. The method of claim 17, wherein the first electrode plate comprises a first electrode collector, a first electrode active material layer coated on both surfaces of the first electrode collector, a first uncoated electrode region at both ends of the first electrode collector where the first electrode active material layer has not been coated, and wherein the first electrode tab is attached to one end of the first uncoated electrode region; and
wherein the second electrode plate comprises a second electrode collector, a second electrode active material layer coated on both surfaces of the second electrode collector, a second uncoated electrode region at both ends of the second electrode collector where the second electrode active material layer has not been coated, and wherein the second electrode tab is attached to one end of the second uncoated electrode region; and
wherein the second electrode tab is arranged on one side of the electrode jelly roll about a center of the electrode jelly roll and the first electrode tab is located on another side of the electrode jelly roll about the center of the electrode jelly roll.

19. The method of claim 18, wherein the upper tape is attached to surround the separator arranged between an end of the electrode active material layer and an end of the uncoated electrode region of an innermost one of the first and second electrode plates, with said end of the electrode active material layer being an end of the electrode active material layer along the direction in which the first and second electrode plates are wound, and said end of the uncoated electrode region being an end of the uncoated electrode region along the direction in which the first and second electrode plates are wound.

20. The method of claim 17, wherein the electrode jelly roll is wound from a center thereof in an order of the second electrode plate, the separator and the first electrode plate.

* * * * *